United States Patent [19]

Luce

[11] 3,919,491

[45] Nov. 11, 1975

[54] TELEPHONE TRANSMITTER AND RECEIVER

[76] Inventor: Curtis L. Luce, 14013 Old Harbor Lane, Apt. 208, Marina Del Ray, Calif. 90291

[22] Filed: Sept. 12, 1973

[21] Appl. No.: 396,388

[52] U.S. Cl. .................................. 179/41 A; 325/55

[51] Int. Cl.[2] .......................................... H04M 1/02

[58] Field of Search ........ 179/41 A; 325/16, 64, 55, 325/51

[56] References Cited

UNITED STATES PATENTS

| | | | |
|---|---|---|---|
| 1,997,705 | 4/1935 | Taylor et al. | 179/41 A |
| 2,488,153 | 11/1949 | Wiener | 179/41 A |
| 3,296,382 | 1/1967 | Klumb et al. | 179/99 |
| 3,476,882 | 11/1969 | Vogelman et al. | 179/41 A |
| 3,535,689 | 10/1970 | Oden | 179/41 A |
| 3,557,312 | 1/1971 | Vogelman et al. | 179/41 A |

*Primary Examiner*—Kathleen H. Claffy
*Assistant Examiner*—Gerald L. Brigance
*Attorney, Agent, or Firm*—John J. Widdowson

[57] ABSTRACT

An extension is provided for a usual telephone having a base with a cradle and a handset cradlably and removably mountable thereon. The extension has a base station cradlable on the telephone base cradle and it has a transmitter which receives sound from the telephone handset ear piece and transmits same, and it also has a receiver to transmit sound to the telephone handset mouth piece. A portable station has in one end portion a transmitter to receive sound and transmit same to the receiver of the base station, and in the other end portion it has a receiver to receive sound from the transmitter of the base station. A portable station is removably mountable with the telephone and it can be hand used by a person with the transmitter thereof in close proximity to the mouth while the receiver thereof is in close proximity of the ear of the user. Another extension is provided having a base station in a usual telephone base and a portable station in a usual handset. The handset having the portable station is removably connectable with the telephone base.

1 Claim, 14 Drawing Figures

TELEPHONE TRANSMITTER AND RECEIVER

BACKGROUND OF THE INVENTION

The invention is related to telephone extensions using radio communication. More particularly the invention is related to a portable telephone extension having radio transmitters and receivers to provide remote radio communication with a telephone. Numerous types of radio communication devices are known in the prior art for carrying on remote sound communications with a telephone. Some prior art devices have the capability of receiving an incoming call signal, transmitting it to the remote station, picking up the telephone handset or the equivalent thereof so a party at the remote location can communicate and at the end of a communication hanging up the telephone handset or the equivalent. Of the known prior art telephone answering devices and remote communication devices, those designed to automatically pick up the telephone handset or make a radio notification of an incoming call have substantially complicated and intricate circuits and mechanical apparatuses which are inherently prone to be troublesome due to their complex nature.

SUMMARY OF THE INVENTION

The telephone transmitter and receiver of this invention is comprised of a base station and a portable station. The base station is mountable with a telephone that has a handset with a mouth piece and an ear piece, and the portable station removably mountable with the telephone base station and the telephone. The base station has a radio transmitter and a radio receiver and the portable station also has a radio transmitter and a radio receiver. The telephone transmitter and receiver extension apparatus of this invention provides a telephone extension that enables a person to pick up the portable station at the telephone, move to a remote location and carry on a conversation or pass sound communication through the telephone from the remote location.

In one specific embodiment, the telephone extension of this invention includes a base station having a radio transmitter to receive sound communication from the telephone and operably to transmit same and a radio receiver to pass sound communication to the telephone mouthpiece. A portable station is provided having a radio transmitter to receive sound communication and transmit same to the base station radio receiver and a radio receiver to receive sound communication from the base station radio transmitter. The base station is mountable with the telephone in the cradle portion thereof normally used to receive and hold a telephone handset and it is adapted to receive and hold the telephone handset. The portable station mounts with the base station over the telephone handset. Removal of the portable station from the base station causes both to operate.

In another specific embodiment, a telephone extension is provided with the same general characteristics as the first described embodiment thereof and additionally it has the portable station transmitter mountable transversely with the base station and the telephone handset. The portable station is provided with an enclosure structure which is mountable in a transverse relation on a center portion of the telephone handset and the base station. The portable station when not in use rests transversely on the center portion of the telephone handset and it is removed therefrom for use.

Another specific embodiment, the telephone extension of this invention is provided with the general features of the second described embodiment thereof and additionally includes a battery recharging apparatus operable to recharge batteries in the portable station. The base station has a transversely extending support portion adapted to receive and hold an end portion of the portable station. The portable station and the extended portion of the base station are provided with the induction coil type power transmitting apparatus to pass electrical power from the base station to the portable station for recharging of batteries in the portable station.

In another preferred specific embodiment the telephone extension includes a telephone base station mountable in the base portion of a telephone and a portable station mountable in the handset portion of the telephone with the handset portion of the telephone being removably connectable from the base station portion of the telephone. The base station transmitter is communicably connected with the circuit of the telephone normally connected to the ear piece and the base station receiver is communicably connected with the circuit of the telephone which is normally connected to the mouthpiece. The portable station in the telephone handpiece the transmitter thereof is connected to the circuit of the mouthpiece and the receiver is communicably connected to the circuit of the ear piece. The handpiece of the telephone and the cord thereof is removably connected with the base portion of the telephone and the complete apparatus is provided with the capability of providing for recharging a battery of the portable station in the telephone handpiece.

One object of this invention is to provide a transmitter and receiver telephone extension apparatus overcoming the aforementioned disadvantages of the prior art devices.

Still, one other object of this invention is to provide a telephone extension usuable with a telephone having a handset with a mouthpiece and an ear piece wherein the extension comprises a base station having a radio transmitter and receiver connectable with the telephone operable to pass sound communication to and from the telephone handset and a portable station having a radio transmitter and receiver for sound communication with the base station to provide two-way sound communication.

Still, another object of this invention is to provide a telephone extension having a telephone base station mountable with a telephone that has a handset with the mouthpiece and the ear piece, with the base station being mountable in the cradle portion of the telephone that is normally used to support the handset and the telephone extension further having a portable station removably mountable with the base station and the telephone handset.

Another object of this invention is to provide a telephone extension having a base station mountable on and connectable with a telephone and a portable station removably mountable with the base station and the handset of the telephone to provide for remote communication and having an apparatus to recharge a battery in the portable station when it is placed on the telephone base station.

Still, another object of this invention is to provide a telephone extension having a base station mountable within the base portion of a telephone and a portable station mountable in the telephone handset with the telephone handset being removably connected with the base portion of the telephone to provide for remote communication with the telephone via the portable station and the base station by radio communication when the handset is removed.

Various other objects, advantages, and features of the invention will become apparent to those skilled in the art from the following discussion, taken in conjunction with the accompanying drawings.

Figures 1, 2, 3, 4:
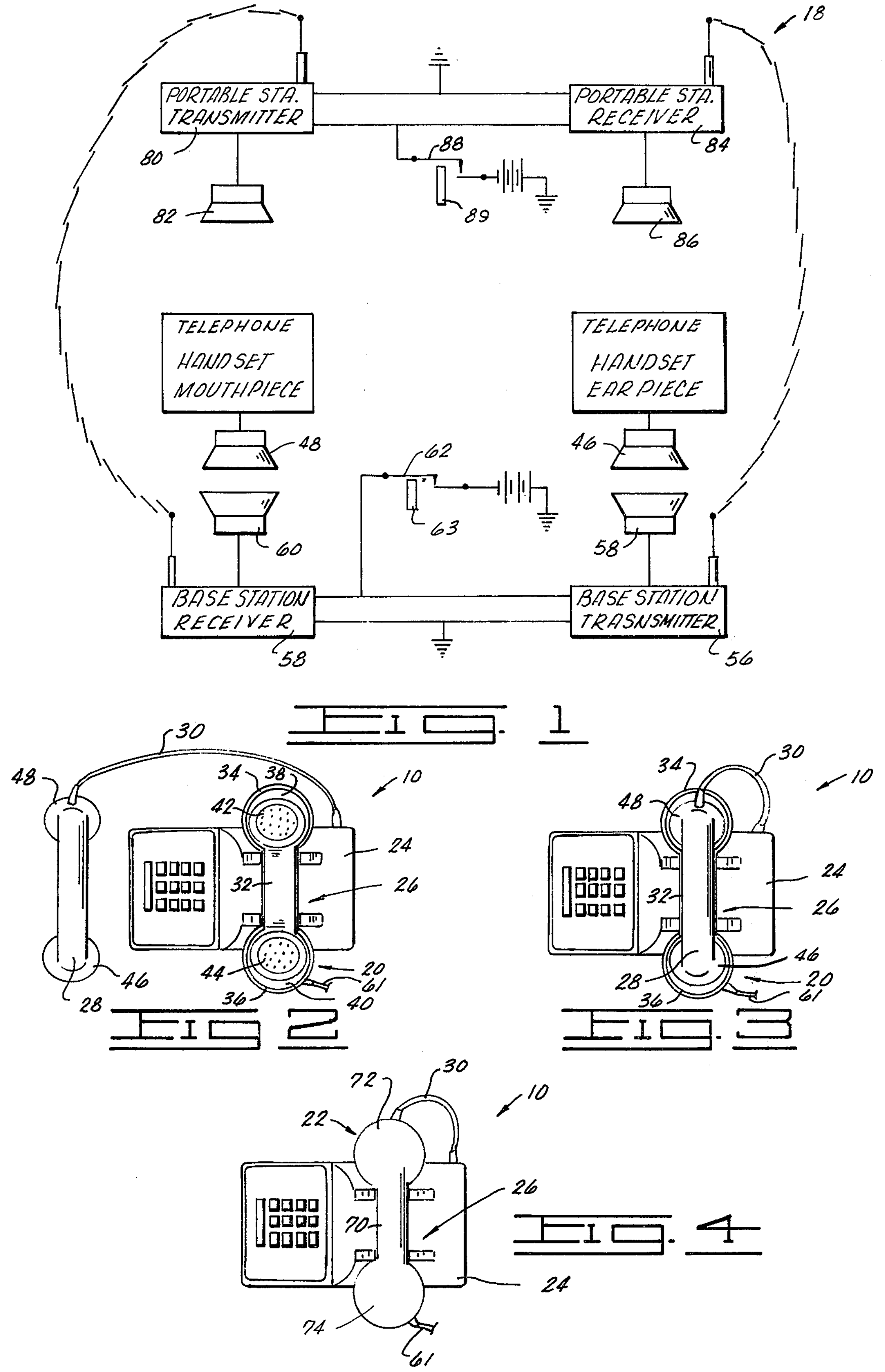
FIG. 1 is a diagrammatical view of an embodiment of the telephone transmitter and receiver apparatus, including portions of the telephone handset and illustrating the operation thereof.
FIG. 2 is a reduced size top plan view of the telephone having an embodiment of the base station thereon with the telephone handset removed and spaced therefrom.
FIG. 3 is a top plan view of the telephone and base station shown in FIG. 2 with the telephone handset in place on the base station.
FIG. 4 is a top plan view of the telephone and base station shown in FIG. 2 with the portable station in place thereon.

The following is a discussion and description of the preferred specific embodiments of the telephone transmitter and receiver and extension apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE PREFERRED EMBODIMENTS

The telephone transmitter and receiver extension apparatus of this invention is disclosed herein in four, closely related embodiments thereof. The several embodiments of the telephone extension apparatus of this invention have similar basic components arranged with the structure of the telephone in slightly different configurations in the several embodiments thereof. The first embodiment, (1), of the telephone extension of this invention is generally indicated at 10 and is shown on Sheets 1 and 2 of the drawings in FIGS. 1–7. Another embodiment, (2), of the telephone extension of this invention is generally indicated at 12 and is shown on Sheet 3 of the drawings in FIGS. 8 and 9 and diagrammatically illustrated on Sheet 1 in FIG. 1. Another embodiment, (3), of the telephone extension of this invention is generally indicated at 14 and is shown on Sheets 3 and 4 of the drawings at FIGS. 10 and 11 and diagrammatically illustrated on Sheet 1 in FIG. 1. Another embodiment, (4), of the telephone extension of this invention is generally indicated at 16 and shown on SHeet 4 of the drawings in FIGS. 12 and 13 and diagrammatically illustrated in FIG. 15.

Referring to the drawings in detail and in particular to FIGS. 1–7 thereof, a telephone transmitter and receiver extension of the first embodiment, (1), is shown therein and is generally indicated at 10. FIG. 1 is a diagrammatical illustration of the telephone transmitter and receiver extension apparatus and such is generally indicated at 18. In referring to FIGS. 2–7 illustrating the structure of the telephone extension 10; same consists of a base station, generally indicated at 20, and a portable station, generally illustrated at 22. The base station 20 is adapted to be mountable with a telephone base portion 24 and supported in the cradle portion thereof, indicated generally at 26, which is normally used for supporting the telephone handset 28. As shown in FIG. 2 the telephone handset 28 is connected by a cable or a cord 30 with the telephone base portion 24.

Figures 5, 6:
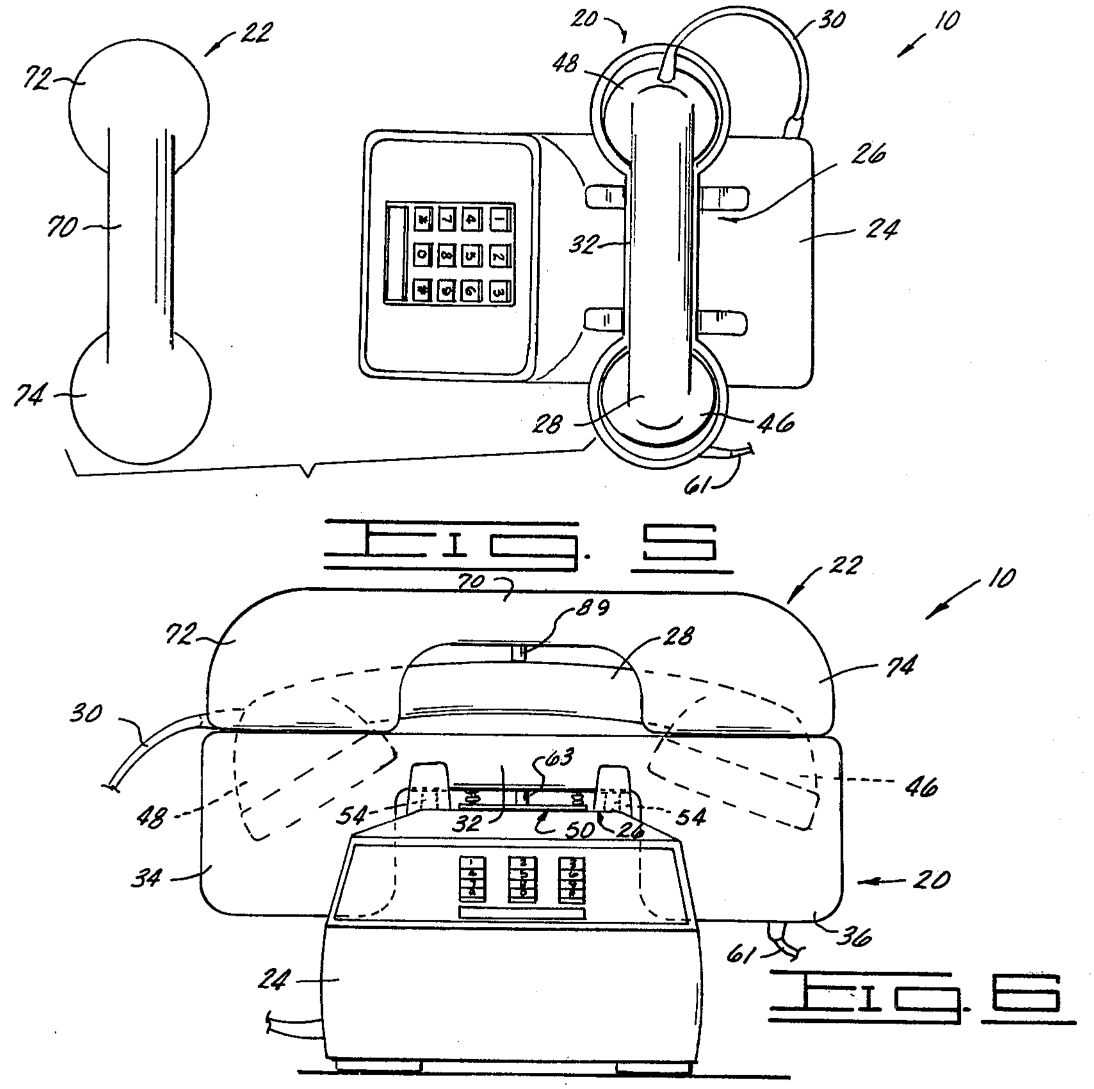
FIG. 5 is a top plan view of the telephone and base station shown in FIG. 3 having the portable station removed and spaced therefrom.
FIG. 6 is a front elevation view of the telephone, base station, and portable station shown in FIG. 4 with the portable station in place on the telephone and base station, with the telephone handset shown in dashed lines therein.
Figure 7:
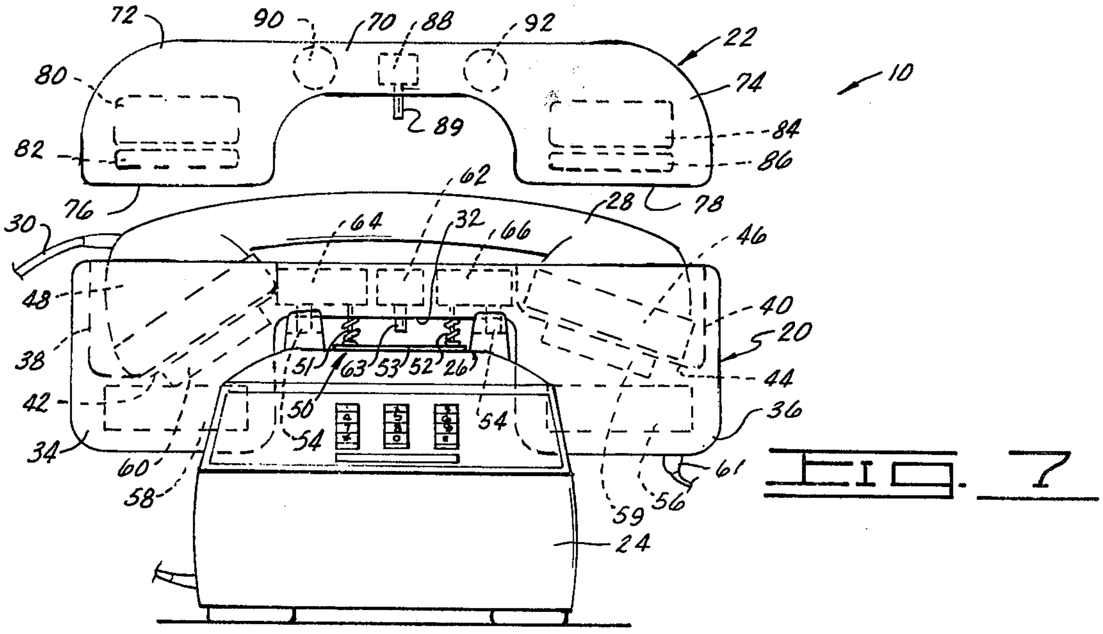
FIG. 7 is a front elevation view of the telephone, base station and portable station shown in FIG. 6 with the portable station in a raised removed position with the portions of the internal components shown in outline.

The base station 20 is preferably constructed in a structural form having a relatively narrow center portion 32 to be cradlably mountable in the handset cradle 26 of the telephone base 24 and having enlarged end portions 34 and 36 to receive and hold the end portions of the handpiece 28 as shown. The interior of the base station structural end portions 34 and 36 are provided with cup like recessed portions 38 and 40 having perforated bottom portions 32 and 34 respectively. The interior of the base station structure recessed portions is preferably constructed to cooperatively engage the handset ear piece portion 46 and mouth piece portion 48 as shown. The structure of the base station 20 in the interior portion thereof is shown in FIGS. 2 and 7. In the center portion of the base station structure a spring urged lifting apparatus is provided, as indicated generally at 50, to aid in raising the base station structure from the telephone cradle structure 26 when the portable station 22 is removed. The spring urged lifting apparatus includes a pair of springs 51 and 52 secured to a plate member 53 on the center portion of the telephone base structure 24. The springs 51 and 52 contact the narrow portion 32 of the base station structure and the plate member 53 and are normally in compression therebetween. In a non-use position the portable station 22 is in place on the base station 20, as shown in FIG. 6, the springs 51 and 52 are compressed and the telephone switch plungers 54 are also depressed. Once the portable station 22 is removed from the base station structure, as shown in FIG. 7, the springs 51 and 52 raise the base station structure from the position shown in FIG. 6 on the cradle 26 thereby allowing the telephone switch plungers 54 to be raised thereby opening the telephone circuit for use.

The internal electrical components of the base station 20 include a base station transmitter 56 and a base station receiver 58. The base station transmitter 56 has a sound receiving device or sound pickup 59, such as a microphone, or electromagnetic induction coupler connected therewith which receives sound communication from the ear piece 46 of the telephone handset 28, via the air and the perforations in the recesses 38 and 40. The base station receiver 58 has a sound transmitting device 60 such as an earphone or a speaker, connected therewith to transmit sound communication to the mouthpiece portion 48 of the telephone handset 28. Electrical power required by the base station 20 is supplied through a cable, indicated at 61. Line 61 will be connected to a 115 volt a.c. electrical outlet. The base station 20 has a control switch 62 connected to batteries 64 and 66 and to the base station transmitter 56 and receiver 58 to control operation thereof. The control switch 62 has a plunger 63 extending downwardly from the center portion of the base station structure, preferably as shown in FIGS. 6 and 7, to contact the telephone base center portion on the plate member 53. The control switch 62 is in an open position when the portable station 22 is resting on the base station 20. At such time the base station sets firmly in the telephone cradle 26 with the springs 51 and 52 compressed and the telephone switch plungers 54 depressed as shown in FIG. 6. The control switch 62 assumes a closed position when the portable station 22 is removed and at such time the base station 20 raises relative to the telephone base structure 24 due to the springs 51 and 52 and is a bit higher in the telephone cradle 26 as shown in FIG. 7.

The portable station 22 is constructed to fit over and rest on the upper portion of the base station 20 and enclose portions of the telephone handset 28. The portable station structure is shown in FIGS. 4–7 and preferably includes a narrow handle-like center portion 70, a mouthpiece end portion 72, and an ear piece end portion 74. The handle-like portion 70 of the portable station structure is preferably narrower than the end portions thereof as shown in FIGS. 5, 6 and 7 so it can be easily grasped by the hand and carried in a manneer similar to the manner in which a telephone handset is grasped, carried and used. The end portions of the portable station structure have outer surfaces 76 and 78 adapted to cooperatively engage with upper surfaces of the base station structure for support of the portable station on the base station. The internal components of the portable station 22 include a radio transmitter 80 having a sound receiving device 82 such as a microphone, and a radio receiver 84 having a sound transmitting device 86, such as a speaker. The radio transmitter 80 and radio receiver 84 are connected to a control switch 88 which is in turn connected to batteries 90 and 92 for powering same. The control switch 88 has a plunger 89 preferably extending from the inner side portion of the center handle-like portion of the portable station structure. The control switch 88 is in an open position when the portable station 22 is in place on the base station structure wherein the plunger 89 contacts the center top side portion of the telephone handpiece 28. When the portable station 22 is removed from the base station 20 the control switch 88 is moved to a closed position as the plunger 89 is removed from contact with the telephone handpiece 28. This connects the batteries 20 and 22 with the radio transmitter 80 and the radio receiver 84 to initiate operation of the portable station 22.

FIG. 1 illustrates a diagrammatical view of the basic operating components of the telephone transmitter and receiver extension apparatus of this invention. FIG. 1 is applicable to the first, second and third embodiments, (1, 2 and 3), of this invention. The elements in FIG. 1 have the numerals of the first embodiment, (1), of this invention for illustration and description purposes. As illustrated in FIG. 1 the base station radio transmitter 56 in the portable station radio receiver 84 are to have radio communication therebetween. Preferably the radio communication between the portable station radio receiver 84 and the base station radio transmitter 56 is on a preselected radio frequency or wave length different than that of the base station radio receiver 58 and the portable station radio transmitter 80. The portable station radio transmitter 80 and the base station radio receiver 56 also have radio communication therebetween which is preferably of a frequency which will not interfer with radio communication between the base station radio transmitter 56 and the portable station radio receiver 84. In use and operation of the telephone transmitter and receiver extension apparatus indicated generally at 18 and shown in FIG. 1 such provides an extension for a telephone which is connected with the telephone by radio communication. When a telephone equipped with the telephone transmitter and receiver extension apparatus of this invention rings the portable station is removed from the base station and the telephone handset; this automatically puts the portable station and the base station into operation to establish radio communication. As a portable station is removed the portable station control switch 88 has the plunger thereof extended thereby connecting the operating circuit and the battery and similarly the control switch 62 on the base station has the plunger 63 thereof extended which connects the battery in the circuit thereof. Once the base station and portable station are in operation radio communication is maintained at all times between the portable station transmitter and the base station receiver and the telephone mouthpiece and likewise between the portable station receiver, the base station transmitter and the handset ear piece. When in operation the portable station is used the same as an extension telephone connected with the telephone on which the base station is mounted would be used so long as the portable station and the base station are within radio range. When a communication is finished and it is decided to hang up the telephone, when the portable station is placed on the base station and the telephone handset in the position it was before removal thereof. In doing this the control switches 62 and 88 are opened thereby turning off the radios of the base station and the portable station.

Figure 8:
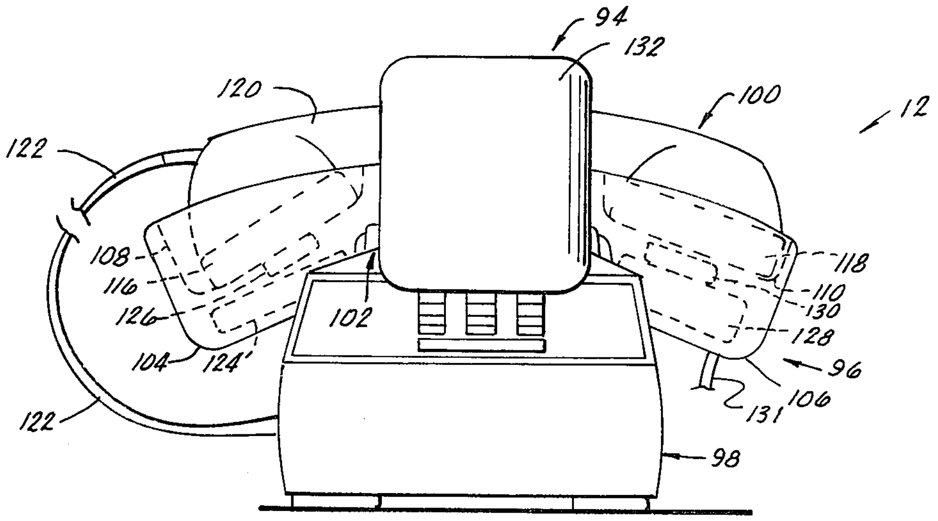
FIG. 8 is a front elevation view of an embodiment of the telephone transmitter and receiver apparatus having the base station mounted on the base portion of the telephone, the telephone handset in place on the base station and the portable station mounted transversely on the base station and the telephone handset.
Figure 9:
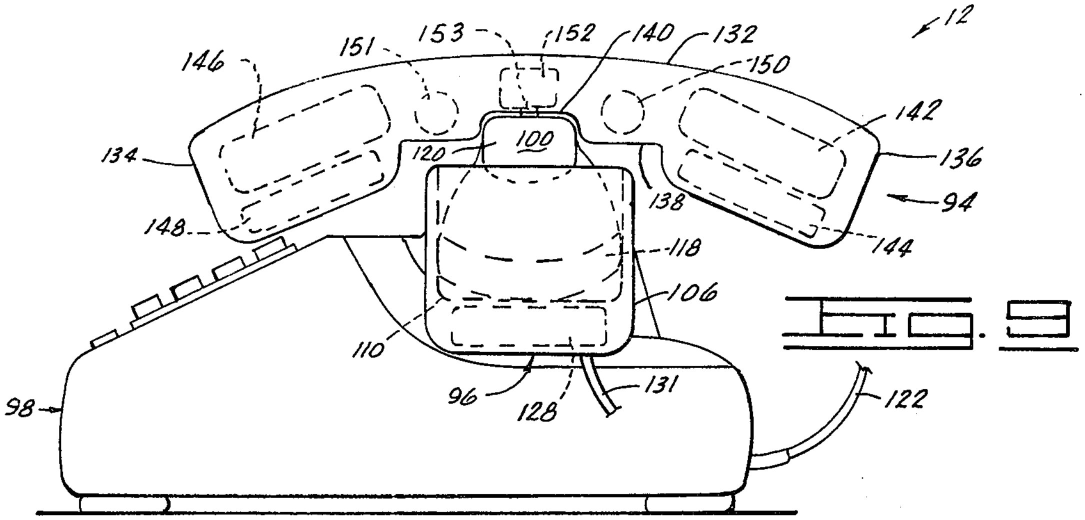
FIG. 9 is a side elevation of the apparatus shown in FIG. 8 with portions of the internal components of the telephone base station and the portable station shown in outline.

Another embodiment, (2), of the telephone transmitter and receiver extension apparatus of this invention is shown on Sheet 3 of the drawings in FIGS. 8 and 9 thereof. The transmitter and receiver telephone extension apparatus 12 includes a portable station, generally indicated at 94, and a base station, generally indicated at 96, with the base station 96 cradlable on the base portion of a telephone, generally indicated at 98, and the portable station 94 being transversely supported on the base station 96 over the telephone handset 100. The base station 96 is supported in the cradle portion 102 of the telephone base portion 98. The structure of the base station includes a center portion mountable on the telephone cradle portion 102 having enlarged end portions 104 and 106 with a cup-like or recessed interior portions 108 and 110 respectively. The base station structure preferably has a pair of springs (not visible in the drawings) are provided between the center portion thereof and the center portion of the telephone cradle portion 102 for raising the base station structure when the portable station is removed. The recessed portions 108 and 110 of the base station structure end portions are constructed and adapted to receive the telephone handset mouthpiece portion 116 and ear piece portion 118 respectively as shown. Preferably, the bottom portions of the recessed portions 108 and 110 are perforated to provide sound communication via the air or electromagnetic induction connection between the telephone handset 100 and the base station. The telephone handset 100 has a narrow center portion resting on the center portion of the base station structure. The handset 100 is connected by a cord 122 with the telephone base 98. The internal components of the base station 96 are shown in outline in FIGS. 8 and 9. A base station radio receiver 124 is connected with a sound transmitting device 126, such as a speaker, to pass sound communication via the air to the telephone microphone in the telephone mouthpiece 116. A base station radio transmitter 128 is connected with a sound pickup or receiving device 130, such as a microphone, to receive sound communication via the air from the telephone speaker in the telephone handset ear piece 118. Electrical power required by the base station 96 is supplied by a cable, indicated at 171. Line 171 will be connected to a 115 volt a.c. electrical outlet. Preferably, the control switch and batteries are similar to that shown in FIG. 7 and described in conjunction with the first embodiment, (1), of this invention. The control switch preferably has a plunger extending from the base station structure in its center portion to contact the telephone base portion 98.

The portable station structure 94 is shown in detail in FIGS. 8 and 9 and includes a relatively thin center portion 132 and attached larger end portions 134 and 136. The center portion 132 has, on what is normally the under or inner side thereof, an indented or recessed portion 138 and a further recessed portion 140. The further recessed portion 140 is sized and constructed to fit over the center handle like portion 120 of the telephone handset 100 to support the portable station structure thereon. FIG. 9 shows in detail the structure of the center portion of the portable station 94 as seen from the side and it further shows in outline the internal components of the portable station. The portable station 94 includes a radio receiver 142 connected with a sound transmitting device 144, such as a speaker, or the like, a radio transmitter 146 connected with a sound receiving device, 148 such as a microphone or the like, a set of batteries 150 and 151 and a control switch 152. The portable station radio receiver 142 and speaker 144 are preferably positioned in one end portion of the portable station structure with the portable station radio transmitter 146 and microphone 148 in the opposite end portion thereof as shown. The batteries 151 and 152 and the control switch 152 are preferably positioned in the center portion of the portable station structure. The control switch 152 has a plunger 153 extending from the recessed center portion 140 of the portable station structure with the switch being connected to the batteries, the radio transmitter, the radio receiver to control operation thereof. As the portable station structure is raised from the position shown in the drawings to a removed position the control switch 152 turns on the radio transmitter 146 and the radio receiver 142 to place the portable station 94 in operation. During use of the portable station a person places their ear next to the sound transmitting device or speaker 144 and their mouth next to the sound receiving device or microphone 148 so they may communicate in the same manner they would if using a telephone. It is to be noted that when the portable station 194 is removed from the base station 96 and telephone handset 100 the base station 96 is raised by the springs and it is turned on by the control switch thereof. The telephone transmitter and receiver extension apparatus 12 of this embodiment, (2), of this invention, functions operationally the same as previously described in conjunction with the apparatus indicated at 18 and shown in FIG. 1.

Figure 10:
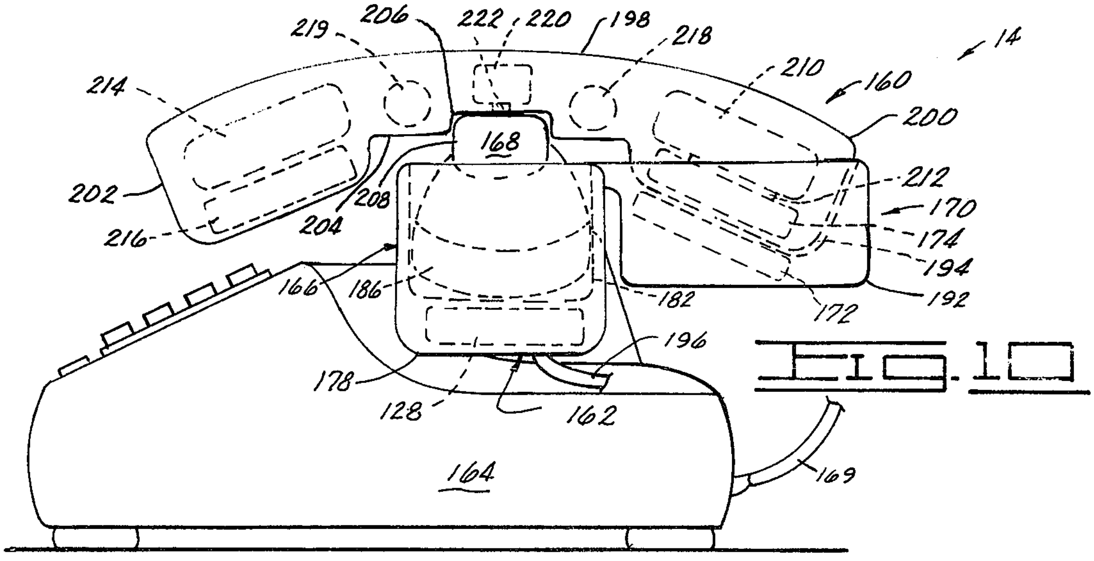
FIG. 10 is a side elevation view of an embodiment of the telephone transmitter and receiver extension apparatus that has provisions for recharging batteries in the portable station wherein the view has portions of the internal components of the base station and the portable station shown in outline.

Another embodiment, (3), of the telephone transmitter and receiver extension apparatus of this invention is shown in FIG. 10 and indicated generally at 14. The telephone transmitter and receiver extension apparatus 14 includes a portable station 160, and a base station 162 cradlable on the telephone base portion 164 in the cradle portion 166 thereof and the portable station 160 positioned transversely on the telephone handset 168 and supported by the base station 162. A cable 169 connects the telephone handset 168 and the telephone base portion 162. The telephone base station 162 has an extended portion indicated generally at 170 which supports an end of the portable station 160 when on the base station 162 and houses an apparatus to cooperatively function with the portable station 160 for recharging of its batteries. The base station extended portion 170 includes an induction coil 172 operable to function in conjunction with another induction coil 174 in the portable station 160 to provide for the transmitting of electrical power between the base station 162 and the portable station 160. The base station 162 and portable station 160 have radio transmitters and receivers of the character described hereinbefore in the first and second embodiments, (1 and 2), of this invention so as to enable them to function in a similar capacity.

Figure 11:
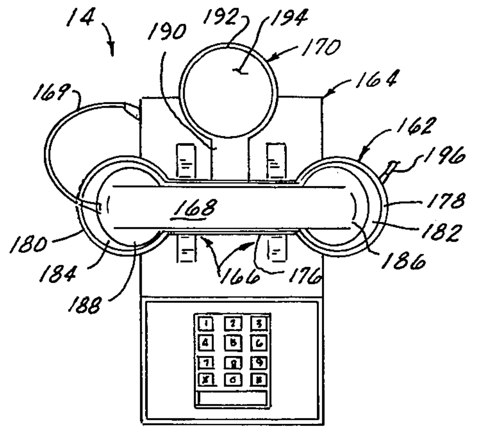
FIG. 11 is a top plan view of the telephone extension apparatus shown in FIG. 10 with the portable station thereof removed.
Figure 12:
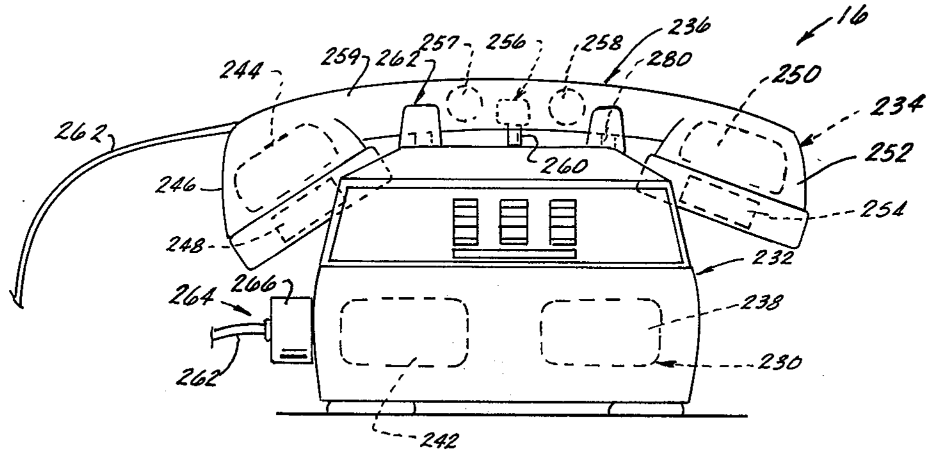
FIG. 12 is a front elevation view of an embodiment of the telephone transmitter and receiver apparatus having the telephone base station in the base portion of the telephone and having the portable station apparatus in the telephone handset, with the view having portions of the internal components of the apparatus shown in outline.

The structure of the base station 162 includes a narrow center portion 176 to span the telephone base 164 and be supported in the telephone cradle portion 166 with enlarged end portions 178 and 180 as shown in FIGS. 10 and 11 and additionally having an extended portion 170 extending from the center portion 176. The end portions 178 and 180 of the base station structure have cup-like recessed portions 182 and 184,, respectively, which are constructed to receive and hold end portions 186 and 188, respectively, of the telephone handset 168. The extended portion 170 is a support portion of the structure and has an arm portion 190 extending transversely from the base station structure narrow center portion 176. The arm portion 190 has an enlarged annular portion 192 on its outer end portion that has a recessed portion 194 therein to receive and hold an end portion of the portable station 160. Electrical power required by the base station 162 and the induction coil 172 is supplied through a cable indicated at 196 in FIG. 11. Power is provided by a 115 volt a.c. electrical outlet. Obviously the power required for the base station and the induction coil recharging portion of the apparatus is directly dependent upon the capacity of the radio transmitters and receivers involved and the power required to operate same.

The portable station 160 is shown in detail in FIG. 10. The portable station structure includes a relatively thin center portion 198 with enlarged end portions 200 and 202. In the center portion of the portable station structure the inner side thereof 204 is recessed relative to the outer end portions and it has a further recessed portion 206 provided in the center thereof to fit over the center portion 208 of the telephone handpiece 168. The portable station has in one end portion 200 the radio receiver 210 which is connected to a sound transmitting device 212, such as a speaker, for passing sound communications. The opposite end portion of the portable station structure has the radio transmitter 214 which is connected to a sound receiving device 216, such as a microphone or the like, for receiving sound communication. The induction coil 174, as shown, surrounds the sound transmitting device 212 or speaker. It is to be noted that the induction coils 172 and 174 must be aligned so that flux flow between them can be established in a proper manner to provide for electrical power transmission. The portable station 160 has batteries 218 and 219 mounted in the center portion 198 thereof along with a control switch 200 which are electrically connected with the receiver 210 and transmitter 214. The control switch 220 has a plunger 222 extendable when the portable station 160 is raised from its resting position the base station 162 and telephone handset 168, with The control switch 220 electrically connects the batteries with the radio transmitter and radio receiver. As shown in FIG. 10 the portable station 160 rests on the base station 162 and the telephone handset 168 in a non-use position and at this time the induction coils 172 and 174 are in the proper position for transmitting electrical power. Preferably, the control switch 222 is a double throw type switch and is connected with the induction coil 174 and the batteries 218 and 219 so when the plunger 222 is in the depressed position the batteries are connected with the induction coil 174 so they can be recharged or maintained in a fully charged condition. When the plunger 222 is released the batteries are connected with the radio transmitter and receiver.

In the use and operation of the telephone transmitter and receiver extension apparatus 14 of this embodiment of this invention, such functions as a portable telephone extension for the purpose of carrying on sound communication via the telephone from a location remote from the telephone. The telephone extension apparatus 14 operates the same way as an extension telephone would operate in regard to sending and receiving sound communication. It functions similar to the telephone apparatus indicated at 18 and shown and described in conjunction with FIG. 1. The feature of the telephone extension apparatus 14 in addition to the features of the apparatus shown in FIG. 1 is the provision for battery recharging. The portable station 160 and base station 162 of this embodiment, (3), is constructed with an induction coil type recharging apparatus for charging the battery or batteries of the portable station and maintaining them in an adequately charged condition. The recharging apparatus functions when the portable station and base station are not being used and are placed together as shown in FIG. 10.

Another embodiment, (4), of the telephone transmitter and receiver extension apparatus of this invention is shown on Sheet 4 of the drawings in FIGS. 12–15 and is generally indicated at 16. The telephone extension apparatus 16 of this embodiment, of this invention includes radio transmitters and receivers and so forth generally similar to that of the hereinbefore described embodiments, (1, 2 and 3), of this invention with the exception that the base station portion of the apparatus is included in the base portion of the telephone and the portable station portion of the apparatus is included in the telephone handset with the telephone handset being removably connectable with the telephone base portion. The telephone extension apparatus 16 includes a base station indicated by a dashed line arrow at 230 within the telephone base portion which is indicated generally at 323, and the portable station indicated generally by the dashed line arrow 234 within the telephone handset which is indicated generally at 236. The base station 230 includes a base station radio transmitter 238 connected with the portion of the telephone apparatus circuit, (not shown), normally transferring sound communication to the speaker in the ear piece 240 of the telephone handset 236, and further including a radio receiver 242 connected with the circuit of the telephone apparatus normally transferring sound communication to the microphone in the telephone mouthpiece 234 of the telephone handset 236. The portable station 234 has a radio transmitter 234 in the telephone handset which is connected with the sound pickup or microphone 248 in the telephone handset mouthpiece 246; and a radio receiver 250 in the telephone handset 236 which is connected with the speaker or earphone in the telephone handset ear piece 252. The portable station 234 has a control switch generally indicated at 256 in the handle portion 259 of the telephone handset 236 which is connected to batteries 256 and 258 and to the radio transmitter 234 and radio receiver 250. The control switch 256 has a plunger 260 which is positioned to contact the upper portion of the telephone base 232 as shown. The center or handle portion 259 of the telephone handset 236 and portable station 234 is cradlable in the cradle portion 262 of the telephone base structure 232. The telephone handset 236 including the portable station 234 is connected with the telephone base 232 by a cord 262 and a plug assembly 264. The plug assembly 264 is removably engagable with the telephone base 232, preferably a side portion of the telephone base structure.

Figure 13:
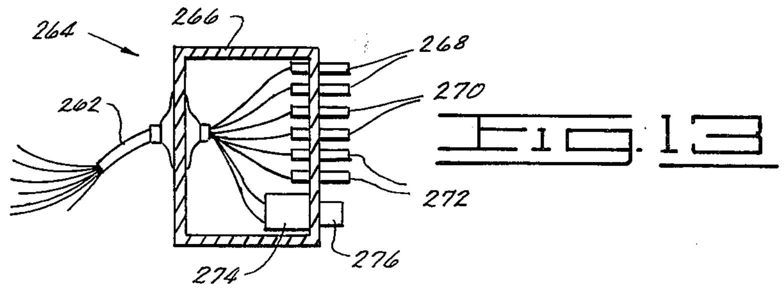
FIG. 13 is an enlarged side elevation view of the plug connector for the telephone extension apparatus shown in FIG. 12 with portions thereof cut away for clarity.

FIG. 13 shows in detail the plug of the plug assembly 264. The plug assembly 264 has an enclosure 266 with a plurality of prongs extending therefrom used for connecting the telephone microphone 248, the telephone earphone or speaker 254, and the battery recharging circuit of the portable station 234 with the circuits in the telephone base 232. A pair of plug prongs indicated at 268 and the accompanying wires are necessary to provide electrical power for charging the batteries 257 and 258. Another pair of prongs, indicated at 270, and the accompanying wires are necessary for electrical transmission of sound communication into the telephone handset 236 and portable station 234. Another pair of prongs, indicated at 272, and accompanying wires are necessary for electrical transmission of sound communication from the telephone handset 236 and portable station 234. The plug assembly 264 additionally includes a switch 274 connected by wires to a point in the electrical circuit between the batteries and the control switch 256 in the portable station 234. The switch 274 is in the open position when the plug assembly 264 is plugged into the telephone base 232 wherein the plunger 276 is pressed; and is in a closed position when the plug assembly 264 is removed from the telephone base 232. The switch 274 prevents the radio transmitter and receiver of the portable station 234 from operating unless the plug is removed from the telephone base 232.

Figure 15:
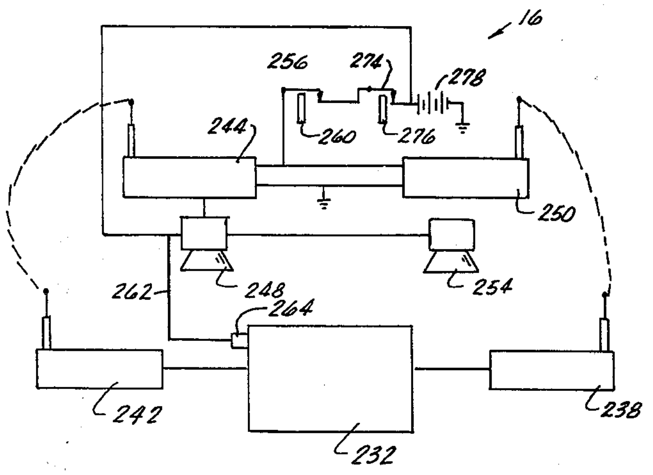
FIG. 15 is a diagrammatical view of the telephone transmitter and receiver apparatus shown in FIG. 12.

FIG. 15 illustrates in a diagrammatical view the electrical connection between the various components of the telephone and the transmitter and receiver extension apparatus 14 of this embodiment, (4), of this invention. The base station receiver 242 and transmitter 238 are connected in the electrical circuit of the telephone with what is indicated as the telephone base 232. Specifically, the telephone base station transmitter 238 and receiver 242 are enclosed within the structure of the telephone base and are connected to the appropriate points in the electrical circuit of the telephone so they have electrical communication with the portions of the circuit electrically transmitting sound communication from the telephone instrument and to the telephone instrument respectively. The telephone handpiece structure has the portable station transmitter 244, receiver 250 and, the control switch 256 enclosed therein. The portable station transmitter 244 is connected with the telephone microphone 248 in the mouthpiece and the receiver 250 is connected with the speaker or earphone 254 in telephone ear piece portion. it is to be noted that the mouthpiece 248 and the ear piece 254 are connected in a normal manner in addition to being connected with the transmitter 244 and receiver 250. The telephone handpiece structure is connected by a cord 262 and the plug assembly 264 with the telephone base 232. The control switch 256 is connected in a series relation with the switch 274 and the power source or battery, indicated in FIG. 15 at 278, to control operation of the portable station transmitter and receiver. The switch 274 prevents the battery 278 from furnishing power for the portable station transmitter 244 and receiver 250 unless the plug assembly 264 is removed from the telephone base as previously described. Once the plug 261 is removed from the telephone base the switch 264 is in a closed position as shown in FIG. 15 and at such time removing the telephone handset 236 from the telephone cradle structure 262 will cause the control switch 256 to be moved to the closed position, as shown in FIG. 15. The control system of the portable station 234 is designed such that the transmitter and receiver thereof will not operate unless the plug assembly 264 is removed from the telephone base and the control switch 256 is in the closed position as it would be when the handset 236 is removed from the telephone base structure 232. Power is provided by a 115 volt a.c. electrical outlet. Electrical power for the base station 230 can be supplied from electrical power available through the telephone lines or it can be provided by a remote power source. Obviously, the amount of electrical power required to operate the base station and charge the batteries of the portable station is dependent on the type and power of the several transmitters and receivers. Control of the base station transmitter 238 and receiver 242 can be connected with the electrical system of the portable station 234 by circuits, such as solid state circuits, which will prevent operation of the base station transmitter 238 and receiver 240 from operating unless the plug assembly 264 is removed from the telephone base structure. Such circuitry can be connected wth the charging circuit for the portable station batteries and designed such that when there is a charging current for the batteries the base station transmitter and receiver will be prevented from operating, such a condition would require the plug assembly 264 to be connected with the telephone base structure. Additionally such a circuit would cause the base station transmitter 238 and receiver 240 to operate once charging current is no longer supplied, such as when the plug assembly 264 is removed from the telephone base 232. The specific on and off control for the base station transmitter 238 and receiver 242 can be connected with the switch hook plungers 280 in the telephone cradle structure 262 such that removal of the handset 236 will activate the base station transmitter 238 and receiver 240. Unless the base station transmitter 238 and receiver 240 are prevented from becoming operable such as by the solid state circuitry it would function continuously.

In the use and operation of the transmitter and receiver telephone extension of this embodiment, (4), of this invention, it provides an apparatus for remote radio communication with a telephone for the purpose of transmitting sound communications. Inasmuch as the transmitter and receiver structures of the telephone extension are mounted within the telephone base structure in the telephone handset structure such provides a compact and versatile sound communications instrument. The telephone can be used in the ordinary manner with the handset connected to the base portion thereof and can be used in the remote manner when the plug assembly is removed from the telephone's base portion and the handset thereby made portable. The radio transmitter of the portable station and the radio receiver of the base station are preferably operable on a radio frequency or wave length different than that of the base station radio transmitter and the portable station radio receiver. In this operating combination, two-way communication is maintained and at all times between the portable station and the base station so it can be used as a normal telephone in regard to two-way communications.

Several features can be included in the telephone transmitter and receiver extension of this invention in all embodiments thereof which make it more advantageous and practical than some prior art and currently used remote communication system. Under current regulations of the Federal Communications Commission, transmitters of less than 100 milliwatts output power do not require licensing. Therefore, the transmitters of the telephone extension of this invention can be constructed, if desired, in a range of 100 milliwatts output or less and thereby eliminates the necessity of transmitter licensing for operation of the telephone extension. Another feature which can be built into the transmitters and receivers of the telephone extension is to provide a scrambling or mixing which will substantially prevent the listening in on a conversation due to the radio communication between the transmitters and receivers of this invention. Such scrambling or mixing of the sound communications carried by the radio signals of the transmitters and receivers can be easily accomplished in the manufacture of them owing to the technology in the radio transmitter and receiver communication art. It is to be noted that the transmitters and receivers of this invention can be constructed to be either the AM, amplitude modulated, or the FM, frequency modulated, type depending upon the desire of the user. Another feature which can be built into the transmitter and receiver structures of this invention is a power regulator which will regulate the output power of the transmitters so the communication is maintained between the portable station and the base station within the limits thereof by increasing or decreasing the power output of the transmitters in response to a returning signal. The purpose of the power regulator is to limit the power output of the transmitters by adjusting the amount of power output from them which is necessary to maintain communication between the transmitters and the receivers with little or no excess. The power regulator feature is desirable in that it would permit the close range use of several such telephone extension devices operating on the same frequencies without substantial interference between them. It is to be noted that the transmitters and receivers of the telephone extension of this invention can be constructed of either the crystal controlled type or the turnable type depending upon the desire of the user.

In the manufacture of the transmitter and receiver telephone extension structure of this invention it is obvious that same provides a radio transmitter and radio receiver apparatus to maintain twoway communication from a remote location with a telephone for the purpose of carrying on sound communication between a remote location and a telephone. The telephone extension includes a base portion or base station mountable with a telephone and a removable portion or portable station which is portable and can be removed from the immediate location of the telephone. The telephone extension apparatus of this invention is constructed to provide two-way radio communication at all times between the remote station and the base station thereof when in operation and it can be used to transmit audible voice communication or other sound communication as desired.

As will become apparent from the foregoing description of the applicant's transmitter and receiver telephone extension, relatively simple means have been provided to expand the use of a telephone for remote communication. The extension structure is economical to operate, simple to use, attractive in appearance and can be made a portion of the telephone structure if desired. The telephone extension can be constructed to insure privacy in radio communications between the portable station thereof and the base station thereof at the telephone so there is no loss of privacy due to remote radio communication.

While the invention has been described in conjunction with the preferred specific embodiments thereof, it will be understood that this description is intended to illustrate and not to limit the scope of the invention, which is defined by the following claims:

I claim:

1. In a telephone having a base with a cradle and a handset removably mountable on the cradle thereof, a telephone extension comprising:

a. a base station in the telephone base, said base station coupled to the telephone line and having a receiver to receive sound communication from the telephone handset and send it as outgoing speech signals on the line, and a transmitter to transmit incoming speech signals from the line to the telephone handset, b. a portable station in the handset having a transmitter to transmit sound communication from the handset microphone to said base station receiver, and having a receiver to receive said incoming speech signals from said base station transmitter and relay them to the handset speaker, c. said handset being physically connectable with the telephone base by a removable plug, said handset to be normally used as a usual telephone handset when said plug is connected to said telephone base, said plug, upon removal from said base, activating said base station and portable station transmitters and receivers to allow remote communication between handset and base.

* * * * *